(12) United States Patent
Worden et al.

(10) Patent No.: US 11,485,393 B2
(45) Date of Patent: Nov. 1, 2022

(54) VEHICLE CONTROL SYSTEM

(71) Applicant: GE Global Sourcing LLC, Norwalk, CT (US)

(72) Inventors: Bret Dwayne Worden, Erie, PA (US); Ajith Kuttannair Kumar, Erie, PA (US); Jingjun Zhang, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 635 days.

(21) Appl. No.: 16/533,287

(22) Filed: Aug. 6, 2019

(65) Prior Publication Data
US 2020/0047781 A1  Feb. 13, 2020

Related U.S. Application Data

(60) Provisional application No. 62/715,859, filed on Aug. 8, 2018.

(51) Int. Cl.
| | |
|---|---|
| *B61K 9/08* | (2006.01) |
| *B61C 15/08* | (2006.01) |
| *B61C 15/14* | (2006.01) |
| *B60W 40/109* | (2012.01) |

(52) U.S. Cl.
CPC ............ *B61K 9/08* (2013.01); *B60W 40/109* (2013.01); *B61C 15/08* (2013.01); *B61C 15/14* (2013.01)

(58) Field of Classification Search
CPC ........ B61K 9/08; B60W 40/109; B61C 15/08; B61C 15/14
See application file for complete search history.

(56) References Cited

U.S. PATENT DOCUMENTS

| | | | |
|---|---|---|---|
| 6,144,901 A | 11/2000 | Nickles et al. | |
| 6,263,266 B1 | 7/2001 | Hawthorne | |
| 8,424,813 B1* | 4/2013 | Voelkerding | E01B 7/10 |
| | | | 246/468 |
| 8,473,128 B2 | 6/2013 | Oldknow et al. | |
| 9,120,493 B2* | 9/2015 | Kumar | B61L 3/006 |
| 9,340,211 B1* | 5/2016 | Singh | B60W 40/068 |
| 2005/0234628 A1* | 10/2005 | Luders | B60W 40/068 |
| | | | 701/80 |
| 2006/0065791 A1* | 3/2006 | McCallum | E01B 3/20 |
| | | | 246/415 R |
| 2009/0095195 A1 | 4/2009 | Kumar et al. | |
| 2010/0023190 A1* | 1/2010 | Kumar | B61L 27/40 |
| | | | 701/20 |

(Continued)

*Primary Examiner* — Hussein Elchanti
(74) *Attorney, Agent, or Firm* — The Small Patent Law Group LLC; Joseph M. Butscher

(57) ABSTRACT

A system and method for controlling a vehicle system determine one or more of a route parameter of a route on which the vehicle system is moving or a vehicle parameter of the vehicle system. The system and method also determine whether a ratio of a lateral force exerted by one or more wheels of the vehicle system on the route to a vertical force exerted by the one or more wheels of the vehicle system on the route increases to a value exceeding a designated threshold as a result of the one or more route parameter of vehicle parameter that is determined. The ratio of the lateral force to the vertical force exerted by the one or more wheels of the vehicle system on the route is reduced to a value less than the designated threshold by changing an operation of the vehicle system.

27 Claims, 7 Drawing Sheets

(56) References Cited

U.S. PATENT DOCUMENTS

| | | | |
|---|---|---|---|
| 2010/0274450 A1* | 10/2010 | Nardi | B60R 21/0132 |
| | | | 701/45 |
| 2017/0043793 A1* | 2/2017 | Evans | B61C 9/14 |
| 2017/0129472 A1* | 5/2017 | Zhu | B61B 13/08 |
| 2020/0047781 A1* | 2/2020 | Worden | B60W 40/109 |
| 2021/0269071 A1* | 9/2021 | Ahuja | B61F 99/00 |
| 2021/0283969 A1* | 9/2021 | Danielson | B60G 17/0195 |

* cited by examiner

VEHICLE CONTROL SYSTEM

CROSS-REFERENCE TO RELATED APPLICATIONS

This application claims priority to U.S. Provisional Application No. 62/715,859, which was filed 8 Aug. 2018, and the entire disclosure of which is incorporated by reference herein.

FIELD

Embodiments of the present disclosure generally relate to systems and methods for controlling movement of vehicle systems.

BACKGROUND

Vehicle systems impart various forces on routes traveled upon by the vehicle systems. For example, weight of the vehicle systems imparts a vertical force on the route, while movement around a curve, rotation of wheels, acceleration, and the like, can impart lateral forces on the routes (e.g., forces that are oriented in directions that are closer to, but not necessarily parallel to, the surface of the tracks). Large differences between these forces can pose a risk to continued safe travel of the vehicle systems.

For example, when a locomotive of other rail vehicle system encounters a curved segment of a track, lateral forces exerted on the rail(s) by the wheels of the vehicle system tend to force the wheel to climb the rail or roll over the rail. The lateral forces exerted by the wheels may be affected by parameters of the route, the wheel, or the vehicle system. For example, the parameters may include route irregularities, wheel irregularities, the vehicle position within a consist, axle tractive effort, the axle position within a multi-axle vehicle system, wheel and/or rail profiles, or the like, and may affect the lateral force exerted by one or the wheels of the vehicle system on the route. As the ratio of lateral forces to vertical forces increases, the risk for derailment also increases.

BRIEF DESCRIPTION

In one embodiment, a method for controlling a vehicle system includes determining one or more of a route parameter of a route on which the vehicle system is moving or a vehicle parameter of the vehicle system. The method also includes determining whether a ratio of a lateral force exerted by one or more wheels of the vehicle system on the route to a vertical force exerted by the one or more wheels of the vehicle system on the route increases to a value exceeding a designated threshold as a result of the one or more route parameter of vehicle system parameter that is determined. The ratio of the lateral force to the vertical force exerted by the one or more wheels of the vehicle system on the route is reduced to a value less than the designated threshold by changing an operation of the vehicle system.

In one embodiment, a vehicle control system includes one or more processors configured to determine one or more of a route parameter of a route on which the vehicle system is moving or a vehicle parameter of the vehicle system. The vehicle system moves along the route and includes one or more wheels. The one or more processors are configured to determine whether a ratio of a lateral force exerted by the one or more wheels of the vehicle system on the route to a vertical force exerted by the one or more wheels of the vehicle system on the route increases to a value exceeding a designated threshold as a result of the one or more route parameter or the vehicle parameter that is determined. The one or more processors are configured to control reduction of the ratio of the lateral force to the vertical force exerted by the one or more wheels of the vehicle system on the route to a value less than the designated threshold by changing an operation of the vehicle system.

In one embodiment, a method for controlling a vehicle system includes determining one or more of a route parameter of a route on which a vehicle system is moving or a vehicle parameter of the vehicle system. Determining the one or more route parameter of the vehicle parameter includes determining that the vehicle system is moving toward a curved section of the route. The method also includes determining whether a ratio of a lateral force exerted by one or more wheels of the vehicle system on the route to a vertical force exerted by the one or more wheels of the vehicle system on the route increases to a value exceeding a designated threshold as a result of the one or more route parameter of vehicle parameter that is determined. The ratio of the lateral force to the vertical force exerted by the one or more wheels of the vehicle system on the route is reduced to a value less than the designated threshold by changing an operation of the locomotive.

In another embodiment, a locomotive includes a chassis and at least two wheel-axle sets attached to the chassis. Each wheel-axle set including an axle, two wheels, and a traction motor. The traction motor of each of the wheel-axle sets is operably coupled to the corresponding axle. Each traction motor is provided with designated electrical power to provide separate tractive effort to move the corresponding axle and the two wheels. The locomotive also includes an electric drive system coupled to the chassis and electrically coupled to each of the traction motors of the wheel-axle sets. The electric drive system having circuitry for generating the designated electrical power responsive to control input signals. The locomotive also includes a friction modification system coupled to the chassis. The friction modification system is configured to controllably apply a friction-modifying substance to plural rail-wheel interfaces ahead of the wheels in a direction of travel of the locomotive. The locomotive also includes a control system having one or more processors. The control system is coupled to the chassis, and is electrically coupled to each of the traction motors of the wheel-axle sets and the friction modification system. The control system is configured to control the friction modification system for application of the friction-modifying substance to the plural rail-wheel interfaces. The control system is also configured to generate the control input signals for controlling the electric drive system to power each of the traction motors with the separate tractive effort. The control system is configured to determine a route parameter of a route on which the locomotive is moving and a vehicle parameter of the locomotive, and to determine whether ratios of lateral forces exerted by the wheels of the locomotive on the route to vertical forces exerted by the wheels of the locomotive on the route increase to values exceeding a designated threshold as a result of one or more of the route parameter of the vehicle parameter that is determined. The control system is configured to control reduction of the ratios of the lateral forces to the vertical forces exerted by the wheels of the locomotive on the route to values less than the designated threshold by controlling the friction modification system concurrently with controlling the separate tractive effort of the at least two wheel-axle sets as a function of one or more of wheel diameter or track curve magnitude.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
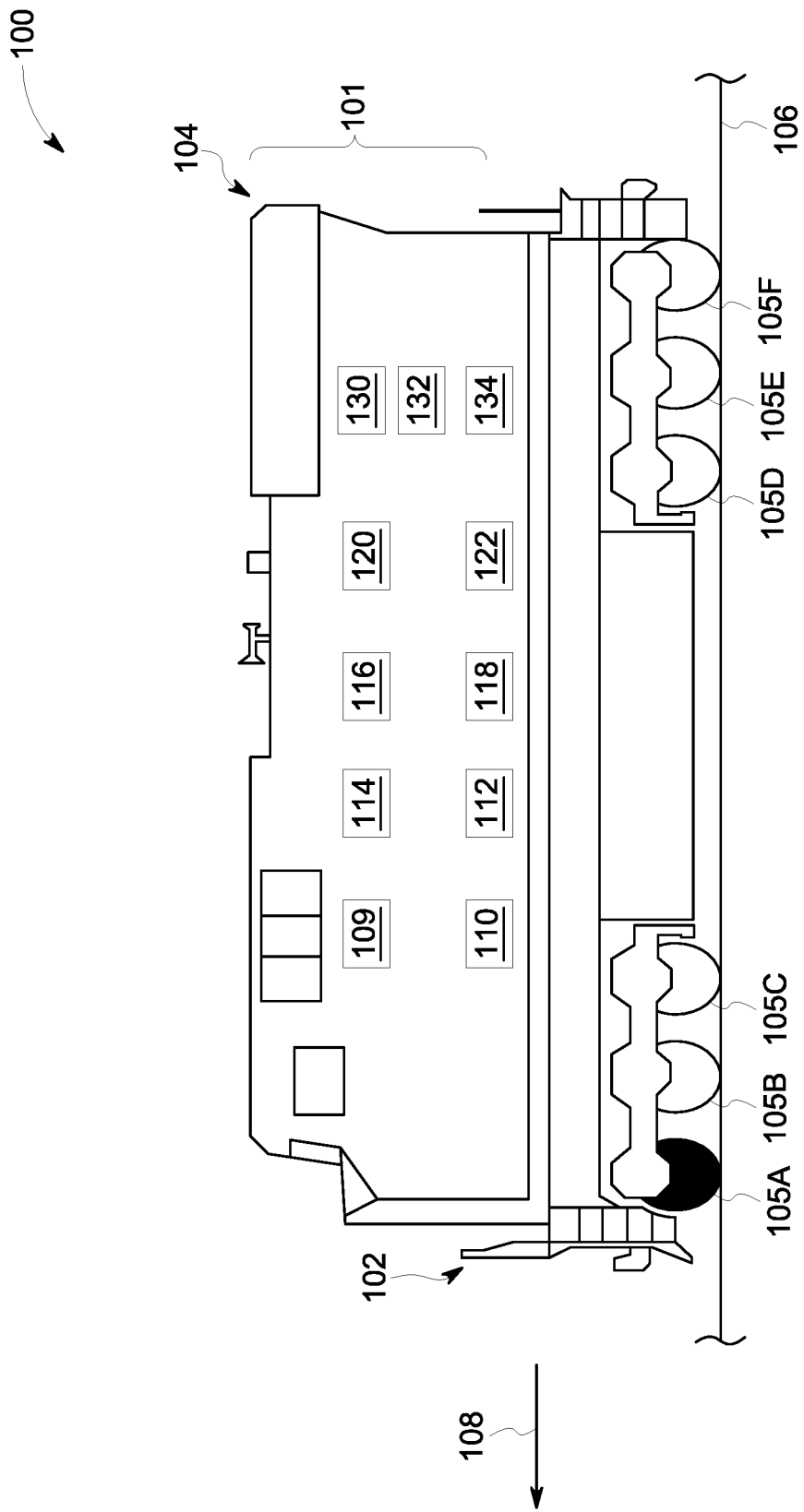
FIG. 1 illustrates one embodiment of a vehicle system.

One or more embodiments of the inventive subject matter described herein includes systems and methods that determine route parameters of a route or vehicle parameters of a vehicle system. The route parameters and vehicle parameters may be used to determine lateral forces and vertical forces that are exerted by the wheels of the vehicle system on the route. As one example, the route parameters may include a radius of curvature of a curved section of the route, a cant of the route, a change in a cant of the route, or the like. Additionally, as one example, the vehicle parameters may include a wheel defect, such as a flat spot, in a wheel, a wheel diameter, a relative difference in wheel diameters between different wheels of the vehicle system, relative difference of a tractive effort, or torque, imparted on an axle of the vehicle system, or the like. The characteristics associated with the route parameters and the vehicle parameters may be used to determine a ratio of the lateral forces to the vertical forces, and whether the ratio increases or decreases due to the route parameters or the vehicle parameters.

The lateral forces that are exerted on the route by the wheels of each axle of a multi-axle rail vehicle system may be exerted by one of the wheels in a direction for the wheel to climb the rail of roll the rail over. The lateral forces are offset by the vertical forces that are exerted on the route by the wheels. As the ratio of the lateral to vertical forces increases, the risk for derailment of the locomotive also increase. As the ratio of the lateral to vertical forces decreases, the risk for derailment of the locomotive also decreases.

Additionally, certain axles of a multi-axle vehicle system may demonstrate higher lateral to vertical force ratios than other axles of the multi-axle vehicle system. For example, the wheels of a first or lead axle in the direction of motion of the vehicle system may exert lateral forces on the route that are greater than the lateral forces that are exerted by the other wheels of the other, non-lead axles of the vehicle system. The greater lateral forces of the wheels of the lead axle may be caused by steering moments required to rotate the vehicle system relative to the vehicle chassis or vehicle support platform, may be caused by the reaction to the rear drawbar moment on the vehicle platform, or the like.

In one or more embodiments, the lateral to vertical forces ratio may also be affected by the relative wheel diameter of each wheel from one axle to a different axle within the vehicle bogie. For example, an axle with a first wheel having a diameter that is smaller than a diameter of a different, second wheel of a different axle will impose a reduced vertical force on the route, and thereby the ratio of the lateral to vertical forces at the first wheel is greater than the ratio at the second wheel.

Responsive to determining that the ratio increases to a value exceeding a designated threshold as a result of the route or vehicle parameters, an operation of the vehicle system may be changed to reduce the ratio of the lateral forces to the vertical forces to a value less than the designated threshold. For example, the operation of the vehicle that may be changed may include changing a wheel creep of a set of wheels, changing (e.g., preventing or allowing) an application of a friction-modifying substance on the route, changing a tractive effort for one or more of the axles of the vehicle system, redistributing the route effort of each axle of the vehicle system, changing weight distribution exerted by each wheel of the vehicle system by raising a wheel away from the route or raising an axle away from the route, or the like. Changing the operation of the vehicle system may decrease the lateral forces but keep the vertical forces relatively the same, thereby reducing the ratio. Alternatively, changing the operation of the vehicle system may keep the lateral forces relatively the same and may increase the vertical forces, thereby reducing the ratio. Reducing the ratio of the lateral forces to the vertical forces reduces a risk of derailment or other accident relative to the ratio remaining the same or increasing. For example, reducing the ratio of the lateral forces to the vertical forces of the wheels exerted onto the route may reduce a risk of one of the wheels climbing a rail or may reduce a risk of one of the wheels rolling over the rail, relative to the ratio remaining the same or increasing.

The vehicle systems described herein can be formed from a single vehicle or from two or more vehicles traveling together. With respect to two or more vehicles, the vehicles may be mechanically coupled with each other, such as by couplers, or may be separate from each other but communicate with each other so that the vehicles can coordinate the respective movements of the vehicles and travel together as a vehicle system. The vehicles may be locomotives (e.g., locomotives and/or rail cars), or the vehicles may be other types of vehicles, such as automobiles, trucks, buses, mining vehicles, or the like. For example, the route may support non-locomotive applications as non-locomotives travel on a road or route, as well as locomotive applications for locomotives that may move on a track.

FIG. 1 illustrates one embodiment of a vehicle system 100. The vehicle system 100 includes a vehicle control system 101 that may operate to control and/or monitor movement of the vehicle system 100. The vehicle system 100 travels along a route 106. In the illustrated embodiments, the vehicle system 100 is a locomotive that travels along the route 106 in a forward direction of movement 108. The vehicle system 100 may be shown or described as a locomotive, but optionally may represent another type of vehicle, as described above. Additionally, the vehicle system 100 may be formed from one or more mechanically and/or logically coupled vehicles, also as described above.

The vehicle system 100 includes several axles 105A-F that are disposed between a front end 102 and a rear end 104 of the vehicle system 100. The axles 105A-F can represent wheel-axle sets in which each of the wheel-axle sets includes an axle, two wheels coupled to each corresponding axle, and a traction motor. The traction motor of each of the wheel-axle sets of the six axles 105A-F may be operably coupled to the corresponding axle by a gear, a gear system, or the like. Each of the six axles 105A-F include two wheels that move over each rail of the route 106. In the illustrated embodiment, the axle 105A is the lead or first axle of the vehicle system 100 as the vehicle system 100 travels along the route 106 in the forward direction of movement 108. Alternatively, the vehicle system 100 may move along the route 106 in a direction that is opposite the direction 108 such that the axle 105F is the lead axle of the vehicle system 100. Optionally, the vehicle system 100 may include any number of axles or wheel-axle sets disposed between the front and rear ends 102, 104.

The vehicle system 100 is propelled by a propulsion system 109 that represents one or more engines, alternators, generators, traction motors, gear boxes (holding gears that translate rotary motion created by an engine or motor into rotary motion of the wheels and/or axles of the vehicle system 100). The propulsion system 109 may also be referred to as an electric drive system. The propulsion system 109 or the electric drive system is electrically coupled to each traction motor of each of the axles 105A-F. The propulsion system 109 generates designated electrical power to provide separate (e.g., different, individual, or the like) tractive effort to each of the different traction motors to move the corresponding axle and the two wheels of each of the six axles 105A-F or wheel-axle sets. For example, the designated electrical power may represent an amplitude or waveform for each traction motor to operate in order for each traction motor to move each corresponding axle and two wheels, and thereby move the locomotive along the route. The propulsion system 109 may be supplied with fuel from a fuel source 110, such as a tank of fuel, one or more batteries, or the like. The vehicle system 100 includes a brake system 112 that slows or stops movement of the vehicle system. The brake system 112 may represent air brakes, friction brakes, regenerative brakes (e.g., that include one or more traction motors of the propulsion system), or the like.

A vehicle controller 114 represents hardware circuitry that includes and/or is connected with one or more processors (e.g., one or more microprocessors, field programmable gate arrays, integrated circuits, or the like) that operate to control movement of the vehicle system 100. The vehicle controller 114 may receive input from an operator onboard and/or off-board the vehicle system 100 via one or more input and/or output devices 116 and, based on the input, change the propulsive force or effort (e.g., torque, power, output, tractive effort, or the like) generated by the propulsion system 109 and/or may chance the braking force or effort generated by the brake system 112. The input and/or output devices 116 can represent one or more touchscreens, display devices, keyboards, pedals, levers, switches, buttons, microphones, speakers, or the like, that receive information from an operator and/or provide information to the operator.

A traction detector 118 represents hardware circuitry that includes and/or is connected with one or more processors (e.g., one or more microprocessors, field programmable gate arrays, integrated circuits, or the like) that operate to detect wheel slip, wheel rail climb, rail rollover, or the like, between one or more wheels of the vehicle system 100 and the route 106. The traction detector may communicate with different sensors 120, 122 of the vehicle system 100 to determined speeds measured by the sensors. One of the sensors 120 can include a rotary speed sensor that measures the speed at which one or more wheels of the vehicle system rotate. The rotary speed sensor can include a tachometer, for example. While only a single rotary speed sensor is shown in FIG. 1, the vehicle system 100 may include more than one rotary speed sensor. Another sensor 122 can include a location sensor that determines locations of the vehicle system 100. For example, the location sensor can include a global positioning system (GPS) receiver, wireless transceiving equipment (that triangulates locations of the vehicle system 100), or the like. Based on data provided by the location sensor 122, the speed at which the vehicle system 100 moves along the route 106 can be determined. For example, the GPS receiver can output a speed at which the receiver determines that the vehicle system 100 is moving along the route 106.

The vehicle control system 101 may create or change a trip plan of the vehicle system 100. The trip plan may designate different operational settings at different locations along one or more routes, different times during a trip, and/or different distances along the one or more routes, as described above. The trip plan may be created and/or modified off-board the vehicle system 100. Optionally, the trip plan may be created and/or modified onboard the vehicle system 100 by an energy management system 134 onboard the vehicle system 100. The energy management system 134 represents hardware circuitry that includes and/or is connected with one or more processors (e.g., one or more microprocessors, field programmable gate arrays, integrated circuits, or the like) that create and/or modify trip plans. The energy management system 134 may examine previous trips of the same or other vehicle system, the vehicle characteristics, the route characteristics, and/or other characteristics to determine the operational settings of the vehicle system 100 at different locations along one or more routes, at different distances along the one or more routes, and/or at different times for a trip that reduce fuel consumption and/or emission generation (e.g., relative to the vehicle system traveling on the one or more routes for the trip at an upper speed limit or route speed). The trip plan may be communicated to the vehicle controller 114 (e.g., from a system off-board the vehicle system and/or from the energy management system 134), and the vehicle controller 114 may automatically generate and communicate control signals to the propulsion system 109 and/or brake system 112. These control signals may automatically control movement of the vehicle system 100 to follow the operational settings of the trip plan. Optionally, the control signals may be communicated to the operator (e.g., via the input/output device 116) to instruct the operator how to control the movement of the vehicle system 100 according to the trip plan.

Figure 2:
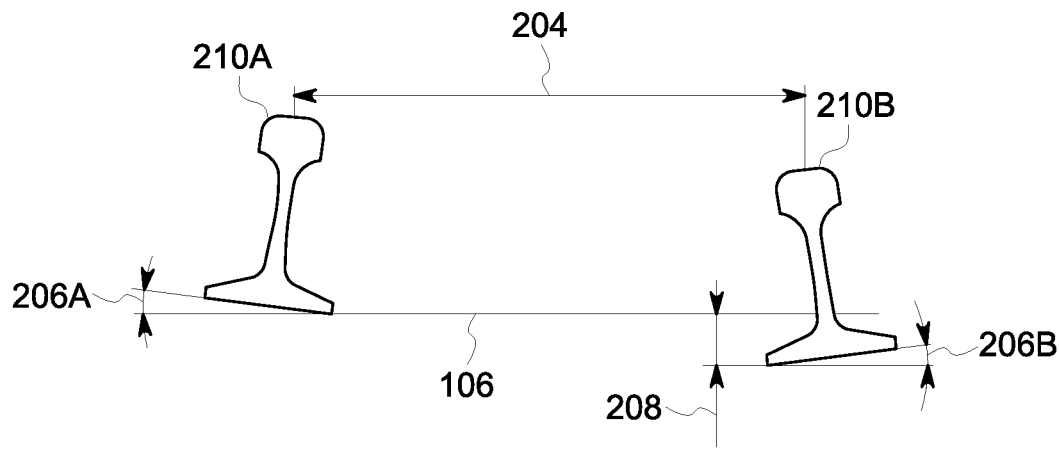
FIG. 2 illustrates a cross-sectional front view of a route.

FIG. 2 illustrates a cross-sectional front view of the route 106. In the illustrated embodiment, the route 106 is a track that includes two rails 210A, 210B that are spaced apart from each other by a rail gauge 204. Alternatively, the route 106 may be any alternative road, track, single rail track, or the like. In the illustrated embodiment, a first rail 210A includes a first rail inclination 206A and a second rail 210B includes a second rail inclination 206B and a cant 208. For example, the segment of the route 106 illustrated in FIG. 2 may represent a curved section of the route 106. The curved section of the route 106 includes the cant 208 and the rail inclinations 206A, 206B for the wheels of the vehicle system 100 to bank curves. For example, the vehicle system 100 may be able to travel over the curved section of the route 106 at a higher speed due to the cant 208 and the rail inclination 206 relative to a slower moving locomotive that travels over a curved section of the route that does not include a cant and/or a rail inclination.

The first rail inclination 206A is an angular distance that the first rail 210A is rotated relative to the route 106. The second rail inclination 206B is an angular distance that the second rail 210B is rotated relative to the route 106. The cant 208 is a distance the second rail 210B is disposed below the plane of the route 106. In the illustrated embodiment, the second rail 210B is disposed below the horizontal plane of the route 106 by the cant 208. Alternatively, the first or second rails 210A, 210B may be disposed above the horizontal plane of the route 106 such that the first or second rail 210A, 210B is elevated above the horizontal plane of the route 106.

The curvature of the route 106 at different locations along the route may be determined by one or more processors of the vehicle control system 101. For example, the curvature may be measured by way of a GPS receiver onboard or off-board the vehicle system 100, by way of inertial sensors onboard the vehicle system 100, by reference to the trip plan as described above, that may include GPS position or distance integration of the velocity or speed at which the vehicle system 100 is moving, or the like. For example, the trip plan may include positions of segments of the route 106 that include curves, as well as a radius of curvature of each curved section of the route 106. Additionally, the trip plan may also include the rail inclination of each rail of the route 106 at each curved section of the route 106.

Additionally, the cant 208 may be determined by one or more processors or systems of the vehicle control system 101. For example, the cant 208 may be measured by way of inertial sensors onboard the vehicle 100, by reference to the trip plan that may include the GPS position or distance integration of the velocity or speed at which the vehicle system 100 is moving, or the like. For example, the trip plan may include cant 208 of each rail at each curved section of the route 106.

Figure 3:
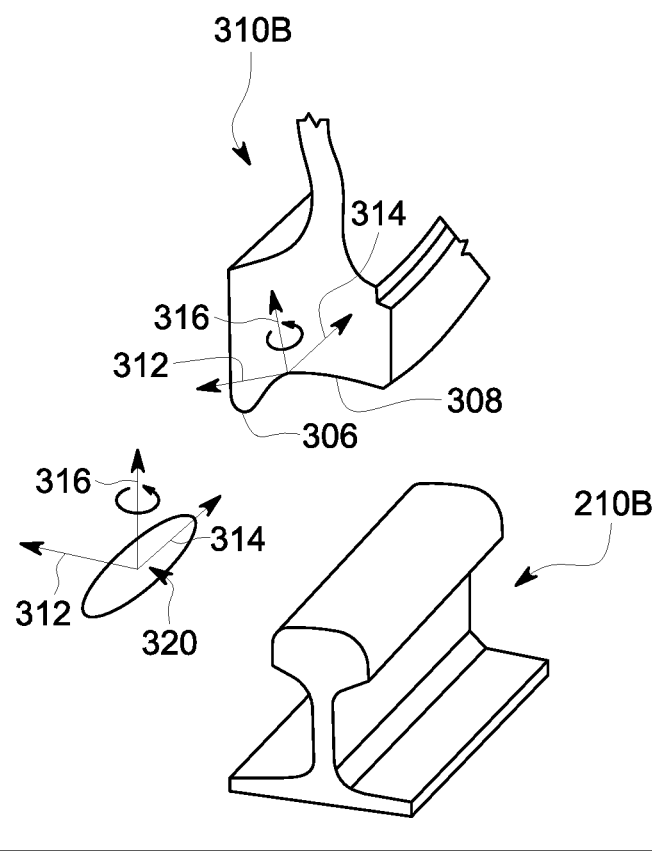
FIG. 3 illustrates a perspective exploded view of forces exerted on one rail of a track by a wheel.
Figure 4:
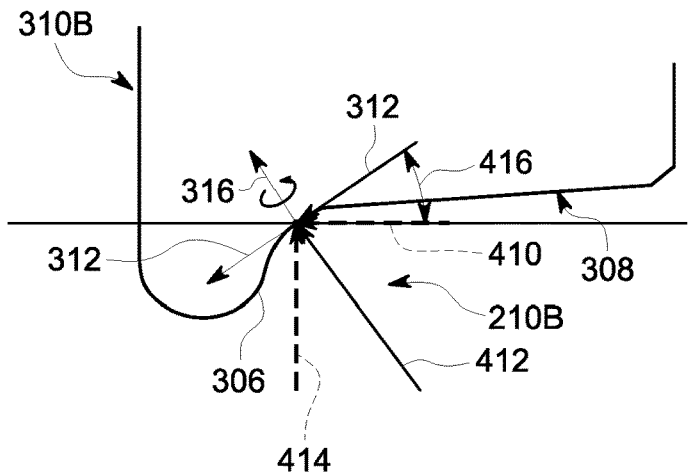
FIG. 4 illustrates the forces of FIG. 3 exerted by the wheel on the rail of the route.

As the vehicle system 100 moves along the route 106, each of the wheels of each axle 105A-F exerts lateral forces and vertical forces onto each rail of the route 106. FIG. 3 illustrates an exploded view of the forces exerted onto the second rail 210B of the route 106 and by a wheel 310B. FIG. 4 illustrates a front view of the forces exerted by the wheel 310B onto the second rail 210B of the route 106. The wheel 310B includes a flange 306 and a running surface 308. A contact patch 320 illustrates the contact between the rail 210B and the flange 306 and running surface 308 of the wheel 310B.

The interaction between the wheel 310B and the rail 210B includes a longitudinal creep force 314, a lateral creep force 312, and a spin creepage moment 316. A lateral normal force 412 is exerted by the rail 210B onto the contact patch 320 of the wheel 310B. A lateral force 410 and a vertical force 414, and the ratio of the lateral force 410 to the vertical force 414, are determined using the lateral creep force 312, the lateral normal force 412, and a contact angle 416 that extends between the lateral creep force 312 and the horizontal plane of the rail. As the ratio of the lateral force 410 to the vertical force 414 increases, the risk of derailment increases. Alternatively, as the ratio of the lateral force 410 to the vertical force 414 decreases, the risk of derailment decreases.

In one example, a longitudinal creep force 314 that is greater than a threshold value will reduce the lateral creep force 312, thereby causing a redistribution of a needed or necessary amount of lateral creep force 312 to the flange 306 of the wheel 310B, or to other wheels and/or axles of the vehicle system 100. A reduction in the lateral creep force 312 may be limited by contact between the flange 306 and the rail 210B when the lateral normal force 412 increases as the contact angle 416 increases.

In one or more embodiments, the longitudinal creep force 314, the lateral creep force 312, and the spin creepage moment 316, individually or combined, may become too high, such that the forces exceed a threshold value, and may cause the contact patch 320 to slide. The total resultant force (e.g., moment) created by the contact patch 320 will be saturated. The relationship between the individual forces (e.g., tangential and/or moment forces) will be governed or controlled by a saturation surface. If the saturation is caused by a dominant longitudinal creep force 314 (e.g., due to high creep and relative tractive effort of the wheel 310B), the lateral creep force 312 will decrease, and the total lateral force 410 will decrease as a result.

Figure 5:
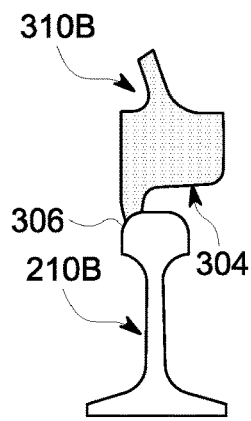
FIG. 5 illustrates one embodiment of a wheel rail climb.
Figure 6:
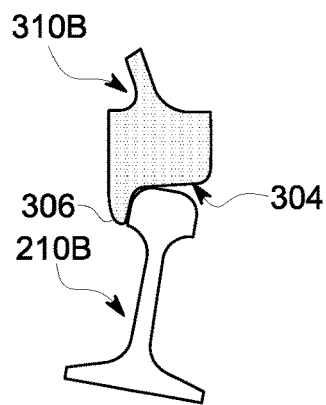
FIG. 6 illustrates one embodiment of a wheel rail rollover.

When the vehicle system 100 encounters the curved section of the route 106 as illustrated in FIG. 2, the vehicle system 100 is at risk of derailing from the route 106 based on the lateral forces and the vertical forces exerted by the wheel onto the rail, as described above. As one example, the vehicle system 100 may derail by one or more wheels climbing the rail. FIG. 5 illustrates one embodiment of the wheel 310B that is derailed from the route by the wheel 310B climbing over the second rail 210B. For example, the wheel 310B exerts a lateral force on the rail 210B that is great enough to force the flange 306 of the wheel 310B to climb up and/or over the rail 210B. As another example, the vehicle system 100 may derail by one or more wheels rolling the rail over. FIG. 6 illustrates one embodiment of the wheel 310B that is derailed from the route by the wheel 310B forcing the second rail 210B to roll over. For example, the wheel 310B exerts a lateral force on the rail 210B that is great enough to force the rail 210B to bend, buckle, become disengaged from the route, or the like.

The ratio of the lateral force to the vertical force may be affected by one or more parameters or factors. The lateral force may be affected by parameters or factors of one or more of the route, the wheels, or the locomotive. Additionally, the vertical force may be affected by parameters or factors of one or more of the route, the wheels, or the locomotive. The parameters that affect the lateral force and the vertical force may the same route or vehicle parameters, may be different route and vehicle parameters, or a combination therein.

The one or more route parameters can be referred to as route or route characteristics and can represent one or more qualities of the route. The route parameters may include rail cant, a change in a cant of the route, a rail inclination, a change in a rail inclination of the route, route integrity, route curvature or a radius of curvature, a route incline or decline (e.g., going up or down a hill) or the like. In one example, the radius of curvature of the curved section of the route may be 5 degrees, 10 degrees, 15 degrees, 20 degrees, or the like.

The route parameters may affect the lateral and/or the vertical forces exerted by the wheel on the rail of the route 106.

The one or more vehicle parameters can also be referred to as vehicle characteristics and can represent one or more qualities of the vehicle. The vehicle parameters may include a wheel defect, such as a flat spot, a wheel diameter, relative differences wheel diameter between different wheels of the vehicle system 100, the position of the axle in the locomotive, the position of the locomotive within a vehicle consist, an axle to rail angle of attack, wheel lubrication, the weight of the locomotive (e.g., a static vehicle or moving vehicle), a fuel level of the locomotive, weight management cylinder pressures (e.g., actuators) of each of the axles, or the like.

Optionally, one or more alternative parameters may also affect the lateral and/or vertical forces that may be exerted by the wheel on the route. For example, a weather condition (e.g., rain, snow, heat, sleet, or the like) may affect one or more forces exerted by the wheel on the route.

Based on a route parameter, a vehicle parameter, and/or alternative parameter, the vehicle system 100 may be likely to experience rail climb and/or rail rollover at various locations, as described above. The vehicle controller 114 may determine whether a ratio of the lateral force (e.g., a lateral force exerted by one or more wheels of the vehicle system 100, as described above) to the vertical force of one or more of the wheels on the route 106, as described above, increases to a value exceeding a designated threshold as a result of the route parameter, the vehicle parameter, and/or the alternative parameter. To reduce the risk of the predicted wheel from climbing the route rail, from rolling the rail over (or reduce the number of wheels that climb or roll the rail over), the trip plan may be created or modified by the energy management system 134 or one or more systems off-board the vehicle system 100 to avoid the one or more wheels from climbing or rolling over the rail. This may be accomplished by an inter-vehicle distribution or redistribution of the tractive efforts generated by different axles and corresponding wheels in the vehicle system 100, or the like.

The ratio of the lateral force to the vertical force exerted by one or more wheels of the vehicle system 100 on the route 106 may increase as a result of one or more of the route parameters, vehicle parameters, or alternative parameters as described above. To reduce the risk of derailment of the vehicle system 100 from the route 106 due to one or more parameters, an operation of the vehicle system 100 may be changed. For example, changing one or more operations of the vehicle system 100 may decrease the lateral forces but keep the vertical forces relatively the same, thereby reducing the ratio. Alternatively, changing one or more operations of the locomotive may keep the lateral forces relatively the same and may increase the vertical forces, thereby reducing the ratio.

In one embodiment, the route parameter includes determining that the vehicle system 100 is moving toward a curved section of the route 106. For example, the input/output device 116 may display an approaching curved section of the route 106 based on the trip plan, or the like. For example, an operator may be notified by one of the input/output devices 116 that the vehicle system 100 is approaching a curved section of the route 106.

As the vehicle system 100 is moving towards the curved section of the route, the operator may change one or more operations of the vehicle system 100 in order to reduce the lateral to vertical forces ratio to a ratio value that is less than a designated threshold, and thereby reduce the risk of derailment at the curved section of the route. For example, the operator may change a setting of the propulsion system 109 and/or the brake system 112 to change a torque that is imparted on one of the axles 105A-F of the locomotive by one or more motors of the propulsion system 109. Optionally, the operator may change the propulsion system 109 to change the torque that is imparted on the first or lead axle 105A with or without concurrently changing a torque imparted on one or more of the other axles 105B-F of the vehicle system 100.

In one or more embodiments, the operator may change a tractive effort that is generated by a motor-axle combination between one or more motors of the propulsion system 109 and the corresponding axle 105A-F of the vehicle system 100. Optionally, the operator may change the tractive effort of the traction motor of the first or lead axle 105A with or without changing a tractive effort of the traction motors of the other axles 105B-F of the vehicle system 100.

Figure 7:
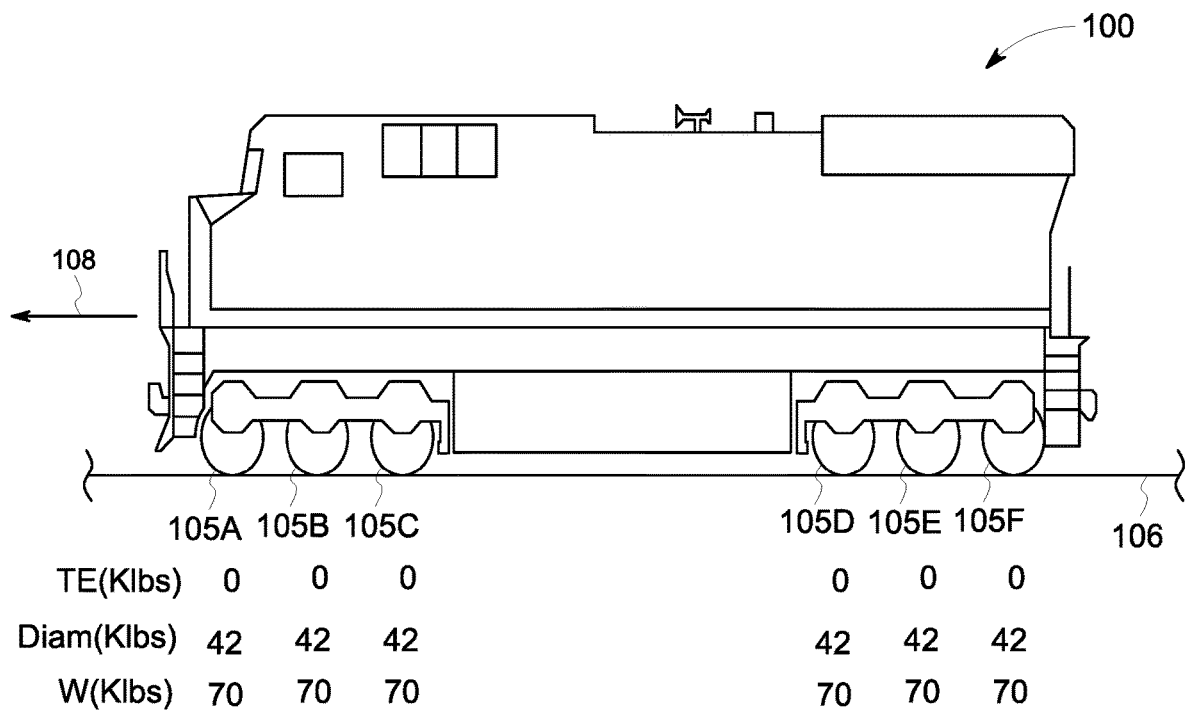
FIG. 7 illustrates one example of operating a vehicle system.

FIG. 7 illustrates one example of operating the vehicle system 100. The vehicle system 100 travels along the route 106 in the forward direction of movement 108. The separate tractive effort (TE) that is generated by a motor-axle combination of each axle 105A-F or wheel-axle set, the corresponding wheel diameter of each wheel of each axle 105A-F, and the weight (e.g., vertical force) exerted by each wheel of each axle 105A-F are indicated. The values of the tractive effort, wheel diameter, and weight in FIG. 7 are for illustrative purposes only and the vehicle system 100 may not be limited to the values indicated.

Figure 8:
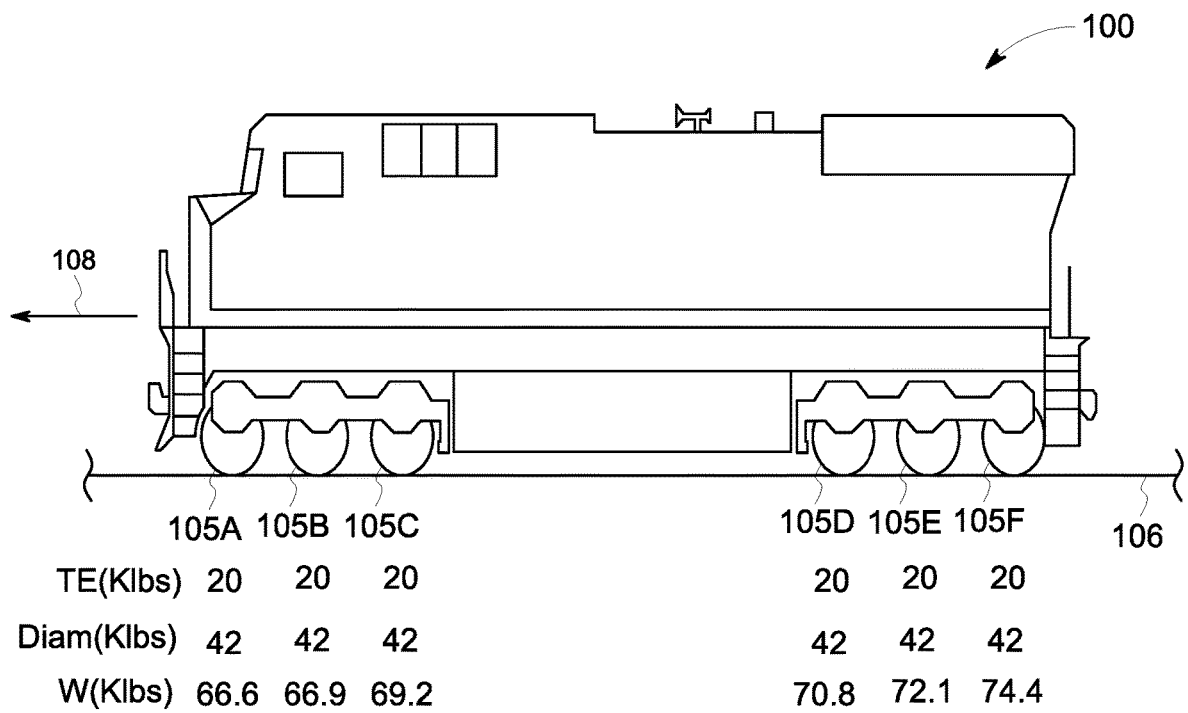
FIG. 8 illustrates one example of changing an operation of the vehicle system of FIG. 7.

FIG. 8 illustrates one example of changing an operation of the vehicle system of FIG. 7. The change in operation includes changing the tractive effort (TE) that is generated by the motor-axle combination between the motors of the propulsion system 109 and each of the corresponding axles 105A-F. In the illustrated embodiment, the tractive effort generated by each of the axles 105A-F is substantially the same. Assuming that the lateral forces remain substantially constant, that the total locomotive moment to yaw remains substantially constant, changing the tractive effort of each of the axles 105A-F changes the weight of each of the wheels exerted onto the route 106. For example, the weight of the lead axle 105A decreases from 70 to 66.6. Decreasing the weight (e.g., the vertical force), increases the ratio between the lateral force to the vertical force of the wheel of the first axle 105A that is exerted onto the route 106. Alternatively, the weight of the last axle 105F increases from 70 to 74.4. Increasing the weight (e.g., the vertical force), decreases the ratio between the lateral to vertical forces of the wheel of the last axle 105F that is exerted onto the route 106. For example, by increasing the tractive effort of each of the axles 105A-F by the same or substantially the same value, the risk of the wheels of the lead axle 105A derailing increases, and the risk of the wheels of the last axle 105F derailing decreases.

Figure 9:
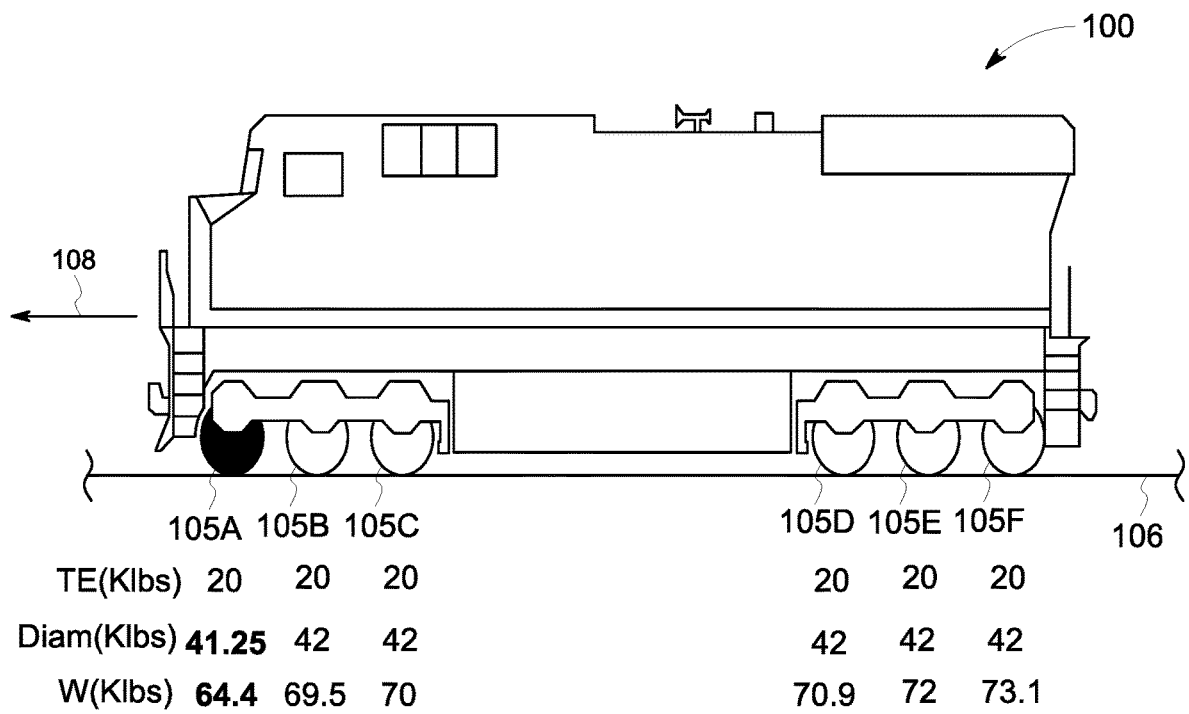
FIG. 9 illustrates a second example of changing an operation of the vehicle system of FIG. 8.

FIG. 9 illustrates a second example of changing an operation of the vehicle system of FIG. 8. The change in operation includes changing the wheel diameter of the wheel of the first or lead axle 105A relative to the wheel diameters of the other wheels of the other axles 105B-F. For example, the wheels of the lead axle 105A may include a defect, such as a flat spot, may be worn, or the like. In the illustrated embodiment, the tractive effort generated by each of the axles 105A-F is substantially the same. Changing the wheel diameter of the wheels of the lead axle 105A reduces the weight (e.g., the vertical force) from 66.6 to 64.4. Additionally, the change in the wheel diameter of the wheel of the lead axle 105A also changes the weight (e.g., vertical forces) exerted by the wheels of each of the other axles 105B-F (e.g., from the weights illustrated in FIG. 8 to the weights illustrated in FIG. 9). For example, reducing the size of the wheel of the lead axle 105A decreases the vertical force exerted by the wheel of the lead axle 105A onto the route, and thereby increases the ratio of the lateral to vertical forces and increases the risk of the wheels of the lead axle 105A derailing.

Figure 10:
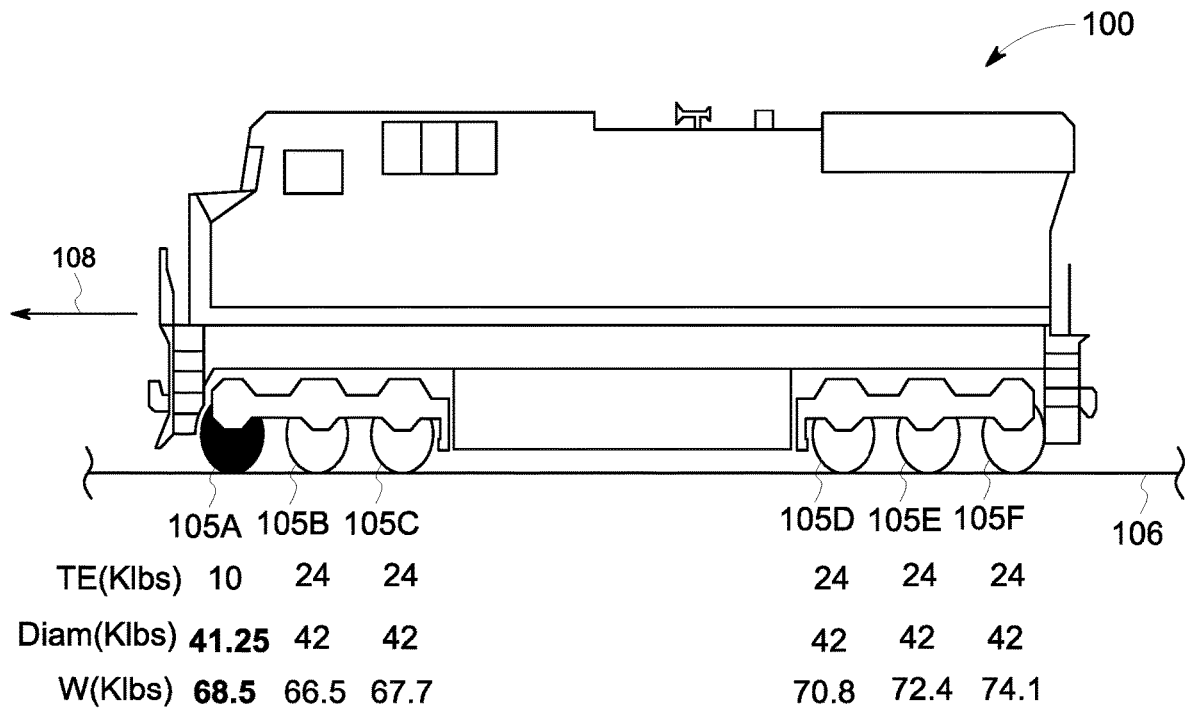
FIG. 10 illustrates a third example of changing an operation of the vehicle system of FIG. 9.

FIG. 10 illustrates a third example of changing an operation of the vehicle system of FIG. 9. The change in operation includes redistributing the tractive effort (TE) that is generated by the motor-axle combination of each axle 105A-F of the vehicle system 100. For example, the propulsion system 109 may separately change the tractive effort generated by the first or lead axle 105A and may redistribute the changed tractive effort to the other axles 105B-F so that the vehicle system 100 may continue to operate at the same speed and power. For example, each traction motor of each of the axles 105A-F may be provided with different designated electrical power that provides the separate tractive effort to move the corresponding axle and two wheels. Alternatively, the operation may include changing the tractive effort that is generated by the lead axle 105A without concurrently changing the tractive effort that is generated by the other axles 105B-F (e.g., without redistributing the power settings of the vehicle system 100). Decreasing the tractive effort that is generated by the lead axle 105A from 20 to 10, increases the tractive effort that is generated by each of the other axles 105B-F from 20 to 24. Additionally, decreasing the tractive effort that is generated by the lead axle 105A increases the weight (e.g., the vertical force) from 64.4 (of FIG. 9) to 68.5 that is exerted by the wheels of the lead axle 105A on to the route 106. Increasing the vertical force exerted onto the route 106, decreases the ratio of the lateral to vertical forces and thereby reduces the risk of the wheels of the lead axle 105 from derailing.

In the illustrated embodiments of FIGS. 7 through 10, the operation of the lead axle 105A of the vehicle system 100 is changed based on the position of the axle in the vehicle system 100. For example, the lead axle 105A of the vehicle system 100 traveling in the direction 108 at a curved section of the route 106 may exert lateral forces on the rail that are greater than the lateral forces of the other axles 105B-F. The lateral forces of the lead axle 105A may be greater because of steering moments that may be required to rotate the vehicle system 100 relative to the vehicle chassis, in response to a drawbar moment at the rear end 104 of the vehicle system 100 on the route 106, or the like.

In one or more embodiments, the operation of the vehicle system 100 is changed for one axle of the locomotive based on the position of the axle in the vehicle system 100. Optionally, the operation may be changed for a single axle based on the position of the axle relative to one or more other axles of the vehicle system 100. Optionally, the operation of the vehicle system 100 may be changed for several axles in a single bogie (e.g., vehicle) or the vehicle system 100 or locomotive consist based on a position of the single bogie in the locomotive. Optionally, the operation may be changed based on the position of the single bogie relative to one or more other bogies of the vehicle system 100 or locomotive consist.

Figure 11:
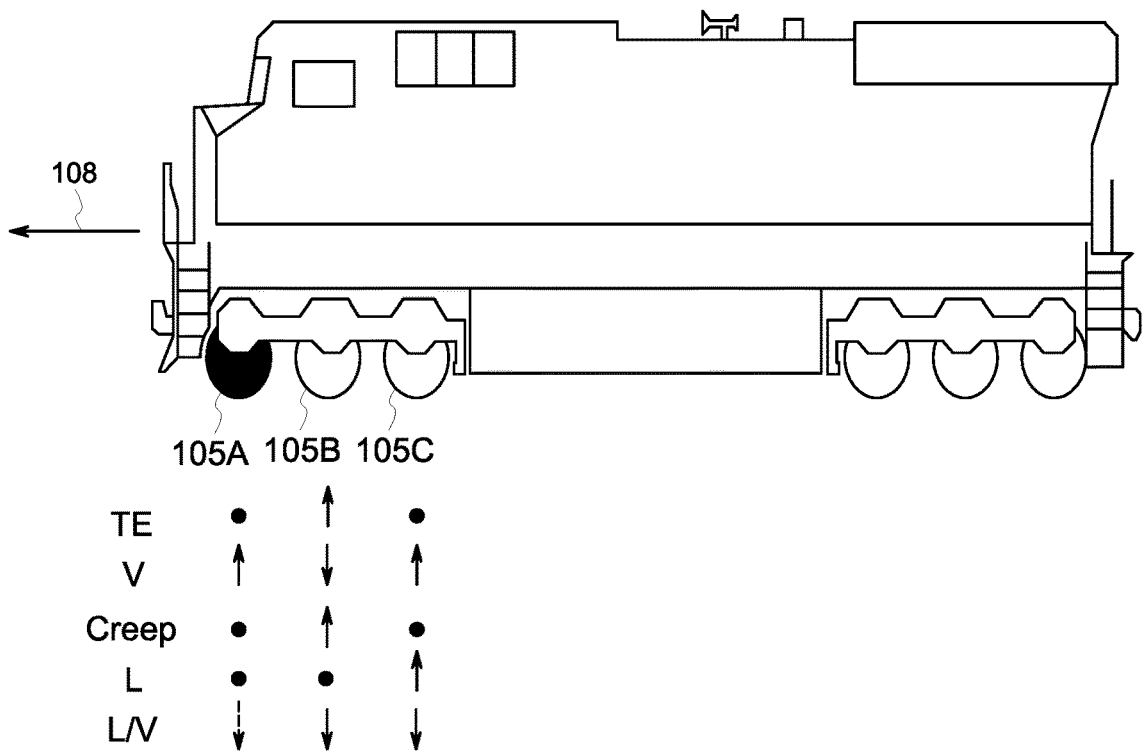
FIG. 11 illustrates one example of a route parameter or vehicle parameter affecting a ratio of lateral forces to vertical forces exerted by wheels of a vehicle system.

FIG. 11 illustrates one example of route parameters or vehicle parameters affecting a ratio of lateral forces to vertical forces exerted by wheels of the vehicle system 100. Assuming that the lateral forces remain substantially constant, that the total vehicle moment to yaw remains substantially constant, based on the position of each axle 105A-C within the vehicle system 100 and relative to each other axle 105A-C, changing the operation of the vehicle system affects route parameters or vehicle parameters of each other axle 105A-C. For example, the tractive effort of the lead axle 105A remains substantially unchanged, the tractive effort of the second axle 105B increases, and the tractive effort of the third axle 105C remains substantially unchanged. Additionally, a wheel creep of the set of wheels of the lead axle 105A remains substantially unchanged, the wheel creep of the set of wheels of the second axle 105B increases, and the wheel creep of the set of wheels of the third axle 105C remains substantially unchanged.

Increasing the tractive effort and the wheel creep of the second axle 105B affects the vertical forces of the lead axle 105A. For example, by increasing the tractive effort and the wheel creep of the second axle 105B, the vertical forces of the lead axle 105A increase and the lateral forces of the lead axle 105A remain substantially unchanged, thereby reducing the risk of derailment of the wheels of the lead axle 105A.

Figure 12:
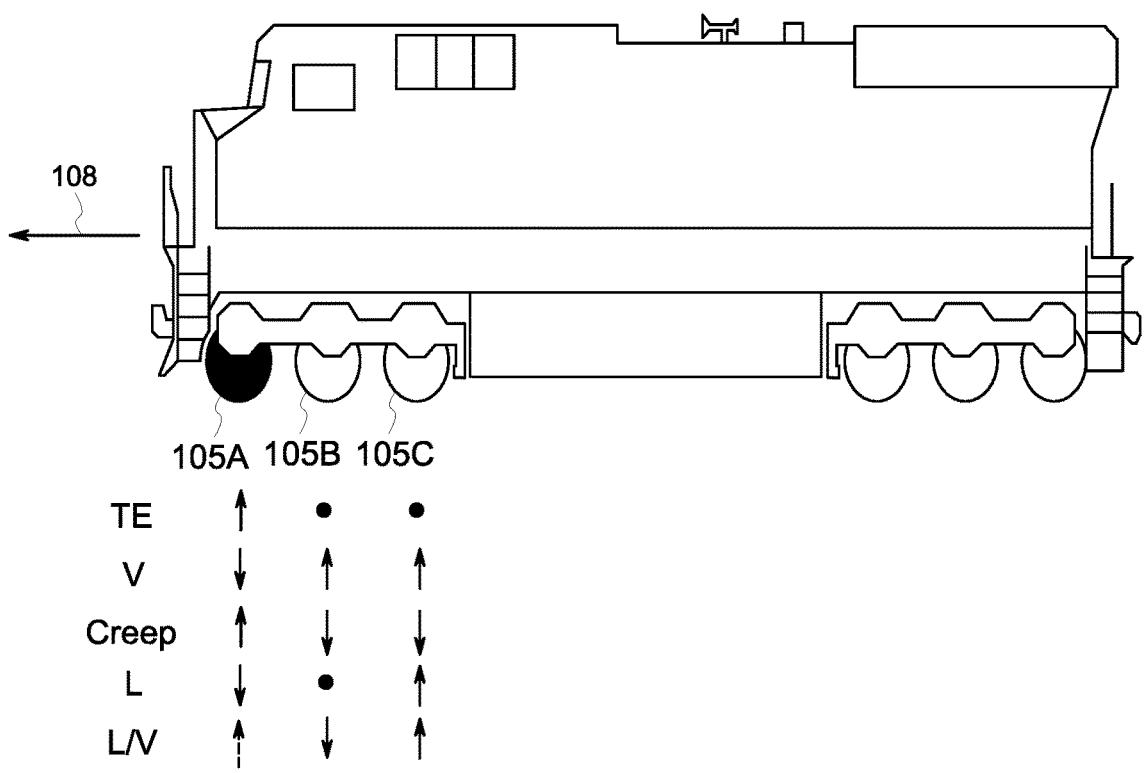
FIG. 12 illustrates a second example of a route parameter or vehicle parameter affecting a ratio of lateral forces to vertical forces exerted by wheels of a vehicle system.

FIG. 12 illustrates a second example of route parameters or vehicle parameters affecting a ratio of lateral forces to vertical forces exerted by wheels of the vehicle system. Changing the operation of the vehicle system affects route parameters or vehicle parameters of each other axle 105A-C. For example, the tractive effort of the lead axle 105A and the wheel creep of the set of wheels of the lead axle 105A increases. The tractive effort of the second and third axles 105B, 105C remain substantially unchanged, and the wheel creep of the wheels of the second and third axles 105B, 105C decreases.

Changing the tractive effort and the wheel creep of the wheels of the lead axle 105A affects the vertical forces and the lateral forces of the lead axle 105A. Increasing the tractive effort decreases the vertical forces of the lead axle 105A, however increasing the wheel creep of the wheels of the lead axle 105A decreases the lateral forces of the lead axle 105A. The route parameters and the vehicle parameters of FIG. 12 illustrate that increasing wheel creep increases the ratio of the lateral to vertical forces, and thereby increases the risk of derailment of the wheels of the lead axle 105A. In the illustrated embodiment, the wheel creep of the wheels of the lead axle 105A is changed without concurrently changing the wheel creep of the wheels of the other axles 105B, 105C. Optionally, the wheel creep of the wheels of the second and third axles 105B, 105C may also be changed (e.g., increase or decrease)

In one or more embodiments, the change in operation of the vehicle system 100 may include preventing an application of a friction-modifying substance to the route 106 by a wheel adhesion control system 132 disposed onboard the vehicle system 100. Optionally, the wheel adhesion control system 132 may also be referred to herein as a friction modification system that is coupled to the chassis or platform of the vehicle system 100. The vehicle controller 114 may controllably apply the friction-modifying substance to the route 106 while the vehicle system 100 travels over a section of the route associated with the route or vehicle parameter that is determined. For example, the friction modification system or the wheel adhesion control system 132 may apply the friction-modifying substance to plural rail-wheel interfaces between the rail of the route 106 and the wheels ahead of the wheels in a direction of travel of the vehicle system 100. The friction-modifying substance may be sand, air, or the like, that is dispensed onto the surface of the route 106 by an adhesion modifying device 130 of FIG. 1 (e.g., a pump or other dispenser) from a tank or other container onboard the vehicle system 100 or from an air compressor. The friction-modifying substance may affect the lateral forces exerted by the wheels of the vehicle system 100 by increasing friction between the wheels and the route 106. The rail conditioning mechanism (e.g., applying a friction-modifying substance) increases traction between the wheels and the route 106, however the rail conditioning mechanism also increases lateral forces at the wheel rail contact area.

In one or more embodiments, the change in operation of the vehicle system 100 may include raising one or more of the axles 105A-F of the vehicle system 100 away from the route 106 relative to one or more other axles 105A-F. For example, the propulsion system 109 may include one or more actuators or cylinders that may be operably coupled with one or more of the axles 105A-F. The vehicle controller 114 may direct the propulsion system 109 to change the actuator or cylinder pressure in order to raise or lower one or more of the axles 105A-F away from or closer to the route 106. For example, the lead axle 105A may be raised away from the route 106 while the vertical position of the other axles 105B-F remains substantially unchanged. Raising or lowering the axles 105A-F closer to or further away from the route 106 changes the vertical forces the wheels exert onto the route 106.

In one or more embodiments, the change in operation of the vehicle system 100 may include raising a wheel of the vehicle system 100 away from the route 106 relative to one or more other wheels of the vehicle system 100. For example, the vehicle controller 114 may direct the propulsion system 109 to change the actuator or cylinder pressure in order to raise one wheel of the lead axle 105A away from the route 106 while the vertical position of the other wheel of the lead axle 105A remains substantially unchanged. Raising or lowering wheels of the vehicle system 100 closer to or further away from the route 106 changes the vertical forces each of the wheels exerts onto the route 106.

Figure 13:
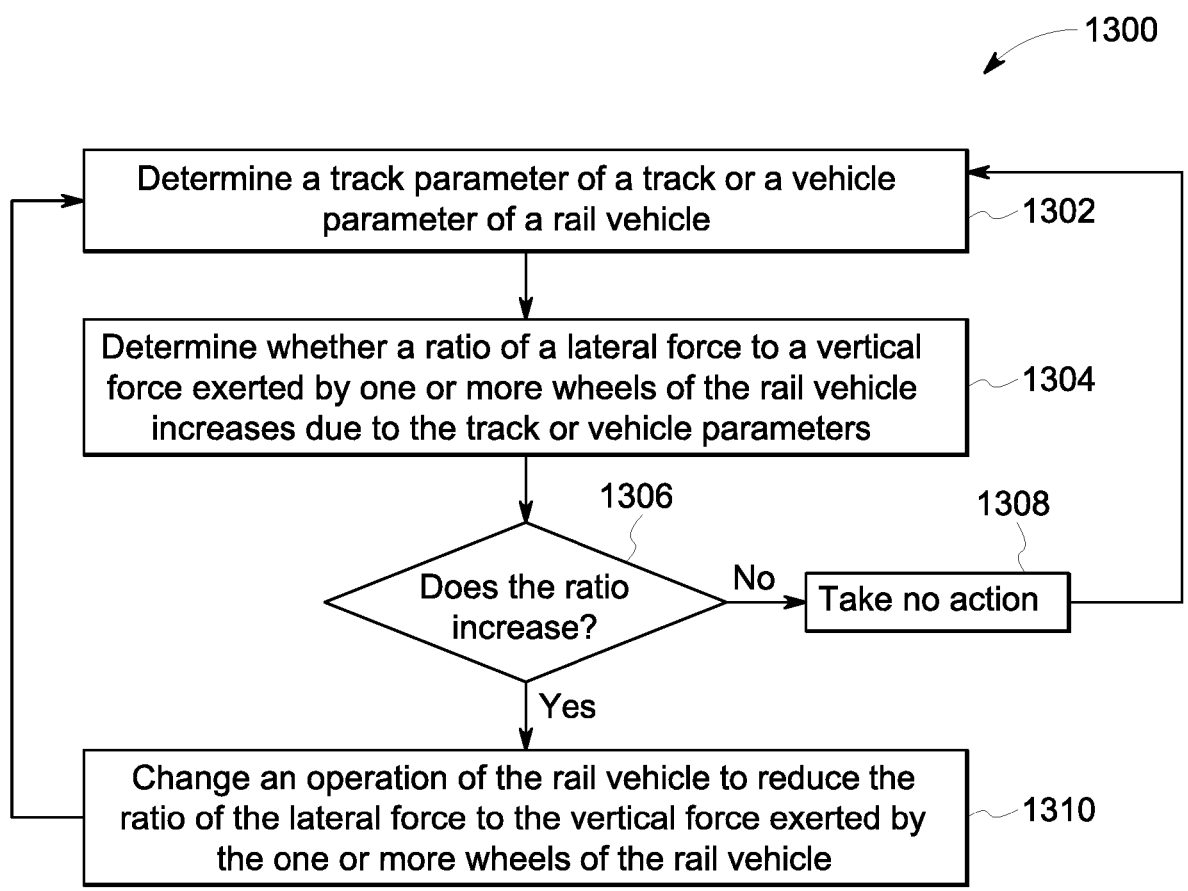
FIG. 13 illustrates a flowchart of one embodiment of a method for reducing a risk of vehicle system derailment from a route.

FIG. 13 illustrates a flowchart 1300 of one embodiment of a method for reducing a risk of one or more wheels of the vehicle system 100 from derailing from the route 106. At 1302, one or more processors of the vehicle control system 101 determines a route parameter of the route 106 or a vehicle parameter of the vehicle system 100. The route parameter may affect the lateral force exerted by one or more wheels of the vehicle system 100 on the route 106 and/or may affect the vertical force exerted by the one or more wheels of the vehicle system 100 on the route 106. The vehicle parameter may affect the lateral force exerted by one or more wheels of the vehicle system 100 on the route 106 and/or may affect the vertical force exerted by the one or more wheels of the vehicle system 100 on the route 106. For example, the route parameter may affect both the lateral and vertical forces and the vehicle parameter may affect both the lateral and vertical forces.

In one or more embodiments, the route parameter may include a determining that the vehicle system 100 is moving towards a curved section of the route, may include determining a radius of curvature of the curved section of the route, may include determining a cant and/or a rail inclination of the route 106, may include determining a change in a cant and/or a change in a rail inclination of the route 106, or the like. The route parameter may be determined by reviewing a trip plan, by data collected by one or more sensors (e.g., inertial sensors, GPS receivers, or the like), or the like.

The vehicle parameter may include a wheel defect, such as a flat spot, in one wheel of the vehicle system 100, may include determining a wheel diameter of a wheel of the vehicle system 100, may include determining a relative difference in wheel diameters between wheels coupled with different axles of the vehicle system, or the like. Optionally, the vehicle parameter may also be based on a position of one axle of a vehicle relative to the other axles of the vehicle, a position of the vehicle within a vehicle consist relative to other vehicles of the vehicle consist, or the like.

The route and/or vehicle parameters may affect the lateral and/or vertical forces that are exerted by each of the wheels of the vehicle system 100 on the route 106. At 1304, a determination is made whether a ratio of the lateral forces to vertical forces exerted by the wheels of the vehicle system 100 increases to a value exceeding a designated threshold as a result of the route and/or vehicle parameters. For example, the route or vehicle parameters may increase the lateral forces while the vertical forces remain substantially unchanged, thereby increasing the ratio. Optionally, the route or vehicle parameters may not affect the lateral forces (e.g., remain substantially unchanged) while the vertical forces may be increased, thereby reducing the ratio. Optionally, the lateral and vertical forces may both increase but the value of the lateral force increases by an amount that is greater than the increase of the vertical force and thereby increases the ratio. Optionally, the lateral and vertical forces may both decrease but the value of the vertical force decreases by an amount that is greater than the decrease of the lateral force and thereby increases the ratio. Optionally, the ratio may increase or decrease by any other combination of one or more of the lateral or vertical forces increasing or decreasing.

At 1306, a decision is made whether the ratio of the lateral forces to the vertical forces increases. If the ratio remains substantially unchanged or decreases, then flow of the method proceeds to 1308 and no action is taken. The flow of the method returns to 1302 and a route parameter and vehicle parameters may be determined for a different, segment of the route 106.

If the ratio increases to a value exceeding the designated threshold, then flow of the method proceeds towards 1310. At 1310, an operation of the vehicle system 100 is changed to reduce the ratio of the lateral force to the vertical force exerted by the wheels of the vehicle system 100 to a value that is less than the designated threshold. The operation that is changed may by changing a torque imparted on one axles of the vehicle system 100 with or without concurrently changing a torque imparted by a different axle, changing a tractive effort generated by a motor-axle combination of one axle with or without concurrently changing a tractive effort generated by another axle, changing a wheel creep of a set of wheels of the vehicle system with or without concurrently changing a wheel creep of a different set of wheels of the vehicle system, preventing the application of a friction-modifying substance to the route 106, changing a cylinder pressure to raise a wheel away from the route relative to another wheel, changing a cylinder pressure to raise one axle away from the route relative to another axle, or the like.

Optionally, the vehicle control system 101 may determine whether different ratios of the lateral forces exerted by the wheels of the different wheel-axle sets or axles 105A-F of the vehicle system 100 on the route 106 to vertical forces exerted by the wheels of the vehicle system 100 on the route 106 increase to values exceeding a designated threshold as a result of the route parameter or the vehicle parameter that is determined. For example, each of the wheels of the different axles 105A-F may have different ratios of lateral to vertical forces exerted by each of the wheels on the route 106. The vehicle control system 101 may control the reduction of one or more of the different ratios to values less than the designated threshold by controlling the friction modifying system of the wheel adhesion control system 132 concurrently with controlling the separate tractive effort provided to each of the different traction motors as a function of wheel diameter, track curve magnitude, or the like.

Optionally, the operation of the vehicle system 100 that is changed may be changed for an axle of the vehicle system 100 based on a position of the axle in the vehicle system, may be changed for a single axle based on a position of the single axle relative to one or more other axles, may be changed for several axles in a single bogie of the vehicle system based on a position of the single bogie in the vehicle system, may be changed for several axles in a single bogie of the vehicle system based on a position of the single bogie relative to another bogie of the vehicle system, or the like.

In one embodiment of the subject matter described herein, a method for controlling a vehicle system includes determining one or more of a route parameter of a route on which the vehicle system is moving or a vehicle parameter of the vehicle system. The method also includes determining whether a ratio of a lateral force exerted by one or more wheels of the vehicle system on the route to a vertical force exerted by the one or more wheels of the vehicle system on the route increases to a value exceeding a designated threshold as a result of the one or more route parameter of vehicle parameter that is determined. The ratio of the lateral force to the vertical force exerted by the one or more wheels of the vehicle system on the route is reduced to a value less than the designated threshold by changing an operation of the vehicle system.

Optionally, determining the one or more route parameter of vehicle parameter includes determining that the vehicle system is moving toward a curved section of the route.

Optionally, the one or more route parameter or vehicle parameter that is determined includes a radius of curvature of a curved section of the route.

Optionally, the one or more route parameter or vehicle parameter that is determined includes a cant of the route.

Optionally, the one or more route parameter or vehicle parameter that is determined includes a change in a cant of the route.

Optionally, the one or more route parameter or vehicle parameter that is determined includes a wheel defect in a wheel of the vehicle system. Optionally, the wheel defect is a flat spot in the wheel of the vehicle system.

Optionally, the one or more route parameter or vehicle parameter that is determined includes a wheel diameter of a wheel of the vehicle system.

Optionally, the one or more route parameter or vehicle parameter that is determined includes a relative difference in wheel diameters between wheels coupled with different axles in the vehicle system.

Optionally, the operation of the vehicle system is changed by changing a torque imparted on an axle of the vehicle system by one or more motors.

Optionally, the operation of the vehicle system is changed by changing the toque imparted on the axle of the vehicle system by the one or more motors without concurrently changing a torque imparted on another axle of the vehicle system by one or more other motors.

Optionally, the operation of the vehicle system is changed by changing a tractive effort generated by a motor-axle combination of the vehicle system.

Optionally, the operation of the vehicle system is changed by changing the tractive effort generated by the motor-axle combination of the vehicle system without concurrently changing a tractive effort generated by another motor-axle combination of the vehicle system.

Optionally, the operation of the vehicle system is changed by changing a wheel creep of a set of wheels coupled with an axle of the vehicle system.

Optionally, the operation of the vehicle system is changed by changing the wheel creep of the set of wheels coupled with the axle without concurrently changing a wheel creep of another set of wheels coupled with another axle of the vehicle system.

Optionally, the operation of the vehicle system is changed by preventing application of a friction-modifying substance to the route by a wheel adhesion control system disposed onboard the vehicle system.

Optionally, the operation of the vehicle system is changed by preventing application of the friction-modifying substance to the route by the wheel adhesion control system while the vehicle system travels over a section of the route associated with the one or more route parameter or vehicle parameter that is determined.

Optionally, the operation of the vehicle system is changed for an axle of the vehicle system based on a position of the axle in the vehicle system.

Optionally, the operation of the vehicle system is changed for a single axle of the vehicle system based on a position of the single axle in the vehicle system relative to one or more other axles of the vehicle system.

Optionally, the operation of the vehicle system is changed for several axles in a single bogie of the vehicle system based on a position of the single bogie in the vehicle system.

Optionally, the operation of the vehicle system is changed for several axles in a single bogie of the vehicle system based on a position of the single bogie in the vehicle system relative to one or more other bogies of the vehicle system.

Optionally, the operation of the vehicle system that is changed includes raising a wheel of the vehicle system away from the route relative to one or more other wheels of the vehicle system.

Optionally, the operation of the vehicle system that is changed includes raising an axle of the vehicle system away from the route relative to one or more other axles of the vehicle system.

In one embodiment of the subject matter described herein, a vehicle control system includes one or more processors configured to determine one or more of a route parameter of a route on which a vehicle system is moving or a vehicle parameter of the vehicle system. The vehicle system is configured to move along the route and includes one or more wheels. The one or more processors are configured to determine whether a ratio of a lateral force exerted by the one or more wheels of the vehicle system on the route to a vertical force exerted by the one or more wheels of the vehicle system on the route increases to a value exceeding a designated threshold as a result of the one or more route parameter or the vehicle parameter that is determined. The one or more processors are configured to control reduction of the ratio of the lateral force to the vertical force exerted by the one or more wheels of the vehicle system on the route to a value less than the designated threshold by changing an operation of the vehicle system.

Optionally, the one or more processors are configured to determine that the vehicle system is moving toward a curved section of the route.

Optionally, the one or more route parameter or vehicle parameter that is determined includes a radius of curvature of a curved section of the route.

Optionally, the one or more route parameter or vehicle parameter that is determined includes a cant of the route.

Optionally, the one or more route parameter or vehicle parameter that is determined includes a change in a cant of the route.

Optionally, the one or more route parameter or vehicle parameter that is determined includes a wheel defect in a wheel of the vehicle system. Optionally, the wheel defect is a flat spot in the wheel of the vehicle system.

Optionally, the one or more route parameter or vehicle parameter that is determined includes a wheel diameter of a wheel of the vehicle system.

Optionally, the one or more route parameter or vehicle parameter that is determined includes a relative difference in wheel diameters between wheels coupled with different axles in the vehicle system.

Optionally, the operation of the vehicle system is changed by changing a torque imparted on an axle of the vehicle system by one or more motors.

Optionally, the operation of the vehicle system is changed by changing the toque imparted on the axle of the vehicle system by the one or more motors without concurrently changing a torque imparted on another axle of the vehicle system by one or more other motors.

Optionally, the operation of the vehicle system is changed by changing a tractive effort generated by a motor-axle combination of the vehicle system.

Optionally, the operation of the vehicle system is changed by changing the tractive effort generated by the motor-axle combination of the vehicle system without concurrently changing a tractive effort generated by another motor-axle combination of the vehicle system.

Optionally, the operation of the vehicle system is changed by changing a wheel creep of a set of wheels coupled with an axle of the vehicle system.

Optionally, the operation of the vehicle system is changed by changing the wheel creep of the set of wheels coupled with the axle without concurrently changing a wheel creep of another set of wheels coupled with another axle of the vehicle system.

Optionally, the operation of the vehicle system is changed by preventing application of a friction-modifying substance to the route by a wheel adhesion control system disposed onboard the vehicle system.

Optionally, the operation of the vehicle system is changed by preventing application of the friction-modifying substance to the route by the wheel adhesion control system while the vehicle system travels over a section of the route associated with the one or more route parameter or vehicle parameter that is determined.

Optionally, the operation of the vehicle system is changed for an axle of the vehicle system based on a position of the axle in the vehicle system.

Optionally, the operation of the vehicle system is changed for a single axle of the vehicle system based on a position of the single axle in the vehicle system relative to one or more other axles of the vehicle system.

Optionally, the operation of the vehicle system is changed for several axles in a single bogie of the vehicle system based on a position of the single bogie in the vehicle system.

Optionally, the operation of the vehicle system is changed for several axles in a single bogie of the vehicle system based on a position of the single bogie in the vehicle system relative to one or more other bogies of the vehicle system.

Optionally, the operation of the vehicle system that is changed includes raising a wheel of the vehicle system away from the route relative to one or more other wheels of the vehicle system.

Optionally, the operation of the vehicle system that is changed includes raising an axle of the vehicle system away from the route relative to one or more other axles of the vehicle system.

In one embodiment of the subject matter described herein, a method for controlling a vehicle system includes determining one or more of a route parameter of a route on which a vehicle system is moving or a vehicle parameter of the vehicle system. Determining the one or more route parameter of the vehicle parameter includes determining that the vehicle system is moving toward a curved section of the route. The method also includes determining whether a ratio of a lateral force exerted by one or more wheels of the vehicle system on the route to a vertical force exerted by the one or more wheels of the vehicle system on the route increases to a value exceeding a designated threshold as a result of the one or more route parameter of vehicle parameter that is determined. The ratio of the lateral force to the vertical force exerted by the one or more wheels of the vehicle system on the route is reduced to a value less than the designated threshold by changing an operation of the vehicle system.

In one embodiment of the subject matter described herein, a vehicle system includes a chassis and at least two wheel-axle sets attached to the chassis. Each wheel-axle set including an axle, two wheels, and a traction motor. The traction motor of each of the wheel-axle sets is operably coupled to the corresponding axle. Each traction motor is provided with designated electrical power to provide separate tractive effort to move the corresponding axle and the two wheels. The vehicle system also includes an electric drive system coupled to the chassis and electrically coupled to each of the traction motors of the wheel-axle sets. The electric drive system having circuitry for generating the designated electrical power responsive to control input signals. The vehicle system also includes a friction modification system coupled to the chassis. The friction modification system is configured to controllably apply a friction-modifying substance to plural rail-wheel interfaces ahead of the wheels in a direction of travel of the vehicle system. The vehicle system also includes a control system having one or more processors. The control system is coupled to the chassis, and is electrically coupled to each of the traction motors of the wheel-axle sets and the friction modification system. The control system is configured to control the friction modification system for application of the friction-modifying substance to the plural rail-wheel interfaces. The control system is also configured to generate the control input signals for controlling the electric drive system to power each of the traction motors with the separate tractive effort. The control system is configured to determine a route parameter of a route on which the vehicle system is moving and a vehicle parameter of the vehicle system, and to determine whether ratios of lateral forces exerted by the wheels of the vehicle system on the route to vertical forces exerted by the wheels of the vehicle system on the route increase to values exceeding a designated threshold as a result of one or more of the route parameter of the vehicle parameter that is determined. The control system is configured to control reduction of the ratios of the lateral forces to the vertical forces exerted by the wheels of the vehicle system on the route to values less than the designated threshold by controlling the friction modification system concurrently with controlling the separate tractive effort of the at least two wheel-axle sets as a function of one or more of wheel diameter or track curve magnitude.

It is to be understood that the above description is intended to be illustrative, and not restrictive. For example, the above-described embodiments (and/or examples thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A method comprising:
    determining one or more of (a) a route parameter of a route on which a vehicle system is moving or (b) a vehicle parameter of the vehicle system;
    determining whether a ratio of a lateral force exerted by one or more wheels of the vehicle system on the route to a vertical force exerted by the one or more wheels of the vehicle system on the route increases to a value exceeding a designated threshold as a result of the one or more route parameter or vehicle parameter that is determined; and
    reducing the ratio of the lateral force to the vertical force exerted by the one or more wheels of the vehicle system on the route to a value less than the designated threshold by changing an operation of the vehicle system.

2. The method of claim 1, wherein determining the one or more route parameter or vehicle parameter includes determining that the vehicle system is moving toward a curved section of the route.

3. The method of claim 1, wherein the one or more route parameter or vehicle parameter that is determined includes one or more of:
    a radius of curvature of a curved section of the route,
    a cant of the route,
    a change in the cant of the route,
    a wheel defect in a wheel of the vehicle system,
    a wheel diameter of a wheel of the vehicle system, or
    a relative difference in wheel diameters between wheels coupled with different axles in the vehicle system.

4. The method of claim 3, wherein the wheel defect is a flat spot in the wheel of the vehicle system.

5. The method of claim 1, wherein the operation of the vehicle system is changed by one or more of:
    changing a torque imparted on an axle of the vehicle system by one or more motors,
    changing a tractive effort generated by a motor-axle combination of the vehicle system,
    changing a wheel creep of a set of wheels coupled with an axle of the vehicle system, or
    preventing application of a friction-modifying substance to the route by a wheel adhesion control system disposed onboard the vehicle system.

6. The method of claim 5, wherein the operation of the vehicle system is changed by changing the torque imparted on the axle of the vehicle system by the one or more motors without concurrently changing a torque imparted on another axle of the vehicle system by one or more other motors.

7. The method of claim 5, wherein the operation of the vehicle system is changed by changing the tractive effort generated by the motor-axle combination of the vehicle system without concurrently changing a tractive effort generated by another motor-axle combination of the vehicle system.

8. The method of claim 5, wherein the operation of the vehicle system is changed by changing the wheel creep of the set of wheels coupled with the axle without concurrently changing a wheel creep of another set of wheels coupled with another axle of the vehicle system.

9. The method of claim 5, wherein the operation of the vehicle system is changed by preventing application of the friction-modifying substance to the route by the wheel adhesion control system while the vehicle system travels over a section of the route associated with the one or more route parameter or vehicle parameter that is determined.

10. The method of claim 1, wherein the operation of the vehicle system is changed for one or more of:
an axle of the vehicle system based on a position of the axle in the vehicle system or
several axles in a single bogie of the vehicle system based on a position of the single bogie in the vehicle system.

11. The method of claim 1, wherein the operation of the vehicle system that is changed includes raising one or more of a wheel or an axle of the vehicle system away from the route relative to one or more other wheels or other axles of the vehicle system.

12. The method of claim 1, wherein the one or more route parameter or vehicle parameter that is determined includes:
a radius of curvature of a curved section of the route,
a cant of the route,
a change in the cant of the route,
a wheel defect in a wheel of the vehicle system,
a wheel diameter of a wheel of the vehicle system, and
a relative difference in wheel diameters between wheels coupled with different axles in the vehicle system.

13. The method of claim 12, wherein the wheel defect is a flat spot in the wheel of the vehicle system.

14. The method of claim 1, wherein the operation of the vehicle system is changed by:
changing a torque imparted on an axle of the vehicle system by one or more motors,
changing a tractive effort generated by a motor-axle combination of the vehicle system,
changing a wheel creep of a set of wheels coupled with an axle of the vehicle system, and
preventing application of a friction-modifying substance to the route by a wheel adhesion control system disposed onboard the vehicle system.

15. The method of claim 14, wherein the operation of the vehicle system is changed by changing the torque imparted on the axle of the vehicle system by the one or more motors without concurrently changing a torque imparted on another axle of the vehicle system by one or more other motors.

16. The method of claim 14, wherein the operation of the vehicle system is changed by changing the tractive effort generated by the motor-axle combination of the vehicle system without concurrently changing a tractive effort generated by another motor-axle combination of the vehicle system.

17. The method of claim 14, wherein the operation of the vehicle system is changed by changing the wheel creep of the set of wheels coupled with the axle without concurrently changing a wheel creep of another set of wheels coupled with another axle of the vehicle system.

18. The method of claim 14, wherein the operation of the vehicle system is changed by preventing application of the friction-modifying substance to the route by the wheel adhesion control system while the vehicle system travels over a section of the route associated with the one or more route parameter or vehicle parameter that is determined.

19. A vehicle control system comprising:
one or more processors configured to determine one or more of a route parameter of a route on which a vehicle system is moving or a vehicle parameter of the vehicle system, the vehicle system configured to move along the route and having one or more wheels,
the one or more processors configured to determine whether a ratio of a lateral force exerted by the one or more wheels of the vehicle system on the route to a vertical force exerted by the one or more wheels of the vehicle system on the route increases to a value exceeding a designated threshold as a result of the one or more route parameter or the vehicle parameter that is determined, and
the one or more processors configured to control reduction of the ratio of the lateral force to the vertical force exerted by the one or more wheels of the vehicle system on the route to a value less than the designated threshold by changing an operation of the vehicle system.

20. The system of claim 19, wherein the one or more route parameter or vehicle parameter that is determined includes one or more of a radius of curvature of the route, a cant of the route, a wheel diameter of the vehicle system, or a wheel diameter difference of the vehicle system.

21. The system of claim 19, wherein the operation of the vehicle system is changed by changing one or more of a torque imparted on an axle of the vehicle system by one or more motors, a tractive effort generated by a motor-axle combination of the vehicle system, a wheel creep of a set of wheels coupled with the axle of the vehicle system, operation of a friction-modifying substance to the route by a wheel adhesion control system disposed onboard the vehicle system.

22. The system of claim 19, wherein the operation of the vehicle system is changed for an axle of the vehicle system based on a position of one or more of the axle or a bogie in the vehicle system.

23. The system of claim 19, wherein the operation of the vehicle system that is changed includes raising one or more of a wheel or an axle of the vehicle system away from the route relative to one or more other wheels or other axles of the vehicle system.

24. A method comprising:
determining one or more of a route parameter of a route on which a vehicle system is moving or a vehicle parameter of the vehicle system, wherein determining the one or more route parameter or vehicle parameter includes determining that the vehicle system is moving toward a curved section of the route;
determining whether a ratio of a lateral force exerted by one or more wheels of the vehicle system on the route to a vertical force exerted by the one or more wheels of the vehicle system on the route increases to a value exceeding a designated threshold as a result of the one or more route parameter or vehicle parameter that is determined; and
reducing the ratio of the lateral force to the vertical force exerted by the one or more wheels of the vehicle system on the route to a value less than the designated threshold by changing an operation of the vehicle system.

25. The method of claim 24, wherein the one or more route parameter or vehicle parameter that is determined includes one or more of:
a radius of curvature of a curved section of the route,
a cant of the route,
a change in the cant of the route,
a wheel defect in a wheel of the vehicle system,
a wheel diameter of a wheel of the vehicle system, or
a relative difference in wheel diameters between wheels coupled with different axles in the vehicle system.

26. The method of claim 24, wherein the operation of the vehicle system is changed by one or more of:
changing a torque imparted on an axle of the vehicle system by one or more motors,
changing a tractive effort generated by a motor-axle combination of the vehicle system, changing a wheel creep of a set of wheels coupled with an axle of the vehicle system, or preventing application of a friction-modifying substance to the route by a wheel adhesion control system disposed onboard the vehicle system.

27. The method of claim 24, wherein the operation of the vehicle system is changed for one or more of:

an axle of the vehicle system based on a position of the axle in the vehicle system or several axles in a single bogie of the vehicle system based on a position of the single bogie in the vehicle system.

\* \* \* \* \*